(12) United States Patent
Kurz et al.

(10) Patent No.: US 9,322,841 B2
(45) Date of Patent: Apr. 26, 2016

(54) CIRCUIT ARRANGEMENT AND METHOD FOR MONITORING A DSP IN THE CONTEXT OF A SAFETY-CRITICAL APPLICATION

(75) Inventors: Nikolaus Kurz, Ueberlingen (DE); Christian Bonerz, Ueberlingen (DE); Erik Mache, Herdwangen-Schoenach (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 510 days.

(21) Appl. No.: 13/820,665

(22) PCT Filed: Sep. 15, 2011

(86) PCT No.: PCT/EP2011/004638
§ 371 (c)(1),
(2), (4) Date: Mar. 4, 2013

(87) PCT Pub. No.: WO2012/041450
PCT Pub. Date: Apr. 5, 2012

(65) Prior Publication Data
US 2013/0173198 A1    Jul. 4, 2013

(30) Foreign Application Priority Data
Oct. 1, 2010    (DE) .......................... 10 2010 047 269

(51) Int. Cl.
| | |
|---|---|
| *G01C 17/38* | (2006.01) |
| *G01P 21/00* | (2006.01) |
| *G05B 9/02* | (2006.01) |
| *G06F 17/10* | (2006.01) |

(52) U.S. Cl.
CPC . *G01P 21/00* (2013.01); *G05B 9/02* (2013.01); *G06F 17/10* (2013.01)

(58) Field of Classification Search
CPC ................ G06F 17/5045; G06F 17/10; G01R 31/31715; G01R 31/31917; G01P 21/00
See application file for complete search history.

(56) References Cited

U.S. PATENT DOCUMENTS

| | | | |
|---|---|---|---|
| 4,841,209 A | 6/1989 | Poumakis | |
| 4,907,230 A * | 3/1990 | Heller et al. .................. | 714/724 |
| 5,576,980 A * | 11/1996 | Whetsel ........................ | 702/119 |
| 5,680,409 A | 10/1997 | Qin et al. | |
| 2005/0049775 A1 | 3/2005 | Mooney | |

FOREIGN PATENT DOCUMENTS

EP    1 980 924 A1    10/2008

OTHER PUBLICATIONS

International Search Report dated Dec. 1, 2011 issued in PCT/EP2011/004638.

* cited by examiner

*Primary Examiner* — Elias Desta
(74) *Attorney, Agent, or Firm* — Scully Scott Murphy and Presser

(57) ABSTRACT

A circuit arrangement of a sensor-triggered control system in a safety critical application with a digital signal processor (DSP) is provided. The DSP calculates a first position or attitude from position or attitude signals generated by a sensor. The first position or attitude meets a predetermined requirement to be accurate and unambiguous. A signal conditioning circuit reduces information content of the position or attitude signals to generate reduced position or attitude signals. A position and attitude calculation circuit determiners a second position or attitude based on the reduced position or attitude signals, which does not meet the predetermined requirement. A control unit compares the first position or attitude with the respective second position or attitude to generate a difference and determines whether the difference is within a predetermined scope of accuracy. If the determination of the control unit is negative, a sensor fault signal is outputted.

13 Claims, 3 Drawing Sheets

CIRCUIT ARRANGEMENT AND METHOD FOR MONITORING A DSP IN THE CONTEXT OF A SAFETY-CRITICAL APPLICATION

BACKGROUND

The invention relates to a circuit arrangement of a sensor-triggered control and/or display system with a digital signal processor (=DSP) in the context of a safety-critical application and a method for monitoring a DSP in the context of a safety-critical application, wherein the DSP determines actual position and/or attitude of an object from the position and/or attitude signals of position and/or attitude sensors.

Digital signal processors and their possible applications are generally known. It is also known that such DSPs can be used in the context of signal processing of position and attitude signals of position and attitude sensors where complex systems can be implemented with low development costs and circuits. Because of the enormous complexity of such integrated circuits and also the generally not provided public accessibility of the circuit diagrams, these cannot generally be fully analyzed or fully tested. For safety-critical applications, however, this is a basic requirement for the application of such circuits; the possibility must at least be provided to be able to detect faults that may occur in the circuit by means of a redundant and independently developed second circuit. In principle it would be possible to use two DSPs from mutually independent sources and to detect faults by comparing the signals output by the two DSPs, but with an almost doubling of the production costs, so that this possibility for an inexpensive circuit is eliminated.

It is thus the object of the invention to find a possibility of coupling the advantages of such a DSP in terms of its simple development with the necessity for monitoring without having to resort to two different DSPs.

SUMMARY

The inventors have recognized the following:

In control systems process values are detected with different sensors. Some process values, in particular position values, are determined by means of sensors which require the evaluation of a plurality of alternating voltages in relation to each other. Examples thereof are linear position transducers, such as LVDTs (LVDT=Linear Variable Differential Transformer), and angle transducers, such as RVDTs (RVDT=Rotary Variable Differential Transformer), resolvers and synchros. Said sensors are typically stimulated with an alternating voltage and feed back one or a plurality of secondary alternating voltages. The position information is contained both in the amplitudes and also in the phases of the secondary voltages relative to the stimulation voltage.

Prior to the introduction of digital signal processors (DSPs), such sensors were implemented by means of customized circuits, partly with discrete components, partly in integrated circuits. Thus, for example, for synchro-sensor input filters, input amplifiers, converters (Scott-T transformers) and a resolver digital converter (RDC) were fitted on a printed circuit board.

Such sensor data can now be detected by means of digital signal processors, wherein said processors are able to simultaneously process a plurality of analog input signals and output signals at a high sampling frequency.

Advantages of such digital signal processors are:

All functions of the measurement chain, namely transformation and evaluation, can take place in the DSP and the amplification step can be omitted.

A DSP can detect a plurality of sensors.

The stimulation voltage can also be produced by the same DSP.

Detection takes place with high accuracy.

The transfer function and other properties of the measurement chain can be adapted by means of software.

Fault detection, e.g. open circuit detection, can be implemented by means of software; an additional test circuit is not necessary.

Low costs.

Low power consumption.

Low space requirement on the printed circuit board.

High MTBF (=Mean Time Between Failures).

Changes are possible by software upload during the integration and afterwards in the field.

In some applications the measurement values are used in safety-critical functions, i.e. incorrect values can lead to significant danger to life and limb, the environment or to material assets. For a complex electronic component such as a DSP it is generally not possible to detect freedom from errors with adequate reliability. Thus DSPs cannot readily be used in safety-critical applications.

The use of two redundant DSPs cannot assist with all fault cases, because faults with a common cause are possible in both instances. The use of two different DSPs in a redundant arrangement, on the other hand, would largely negate the advantages of the DSP, as would the monitoring of the DSP by means of a full traditional circuit.

For this reason it is desirable to have a device or a method that enables the monitoring of a measurement value detected by a DSP with minimal additional circuit complexity. In contrast to the traditional circuit, less stringent requirements can be used for a test value in terms of accuracy, transmission speed and uniqueness. As result of this and by the use of other existing elements, said invention provides a simple and inexpensive method of monitoring a sensor value detected by a DSP so that it is suitable for use in a safety-critical application.

If the secondary alternating voltages are rectified, they can be detected by any conventional A/D converter (analog/digital converter). A control system requires at least one central processor (CPU=Central Processing Unit), which carries out the control calculations with the process data detected by the classical circuit and/or the digital signal processors.

Said central processor normally supports at least one analog input channel, which is able to detect any number of analog voltages using a multiplexer, regardless of a reduced sampling frequency.

It is, however, not possible to uniquely determine the sensor position from the rectified voltages. Furthermore, the rectification represents a low pass filter process and causes a time delay and amplification of the signal.

For this reason the rectified secondary voltages cannot be processed in the same way as with normal algorithms for calculating the sensor position. For this reason the time delay during the signal detection and the ambiguity because of losses in the phase information must be taken into account during the calculations:

Detecting rectified secondary voltages, e.g. x and y;

Inverting one or both voltages: $x^*=-x$, $y^*=-y$, in order to compensate a loss of phase information during the rectification;

Calculating sensor positions correlating with $p=f(x,y)$ and:

$$p^*=f(x^*,y).$$

The low pass filtering and other time delays introduced into the signal chain can be expressed using a transfer function f(t). In order to compensate for said transfer function, the detected voltages or the calculated sensor positions can be transformed using the inverse transfer function. Because a lead characteristic for the compensation of a signal delay (e.g. PD element) usually leads to large amplification of the background noise, it is preferable to use the transfer function on the sensor position P calculated by the digital signal processor:

$$P'=f(P(t))$$

The time delay in the P signal chain g(t) is normally significantly smaller than in the p or p* signal chain, so that it can be ignored. If this is not the case, P' can be derived as follows:

$$P'=g^{-1}f(P(t))$$

In the previous process the voltage pairs (x,y*) and (x*,y*) remained ignored. Said pairs can, however, either be calculated or the original position P can be reduced to a range of values which corresponds approximately to p, p* and is normally obtained from a modulo operation with m=180 deg with:

$$P''=P'\mathrm{mod}(m).$$

At least one of the values p and p* must now coincide approximately/accurately with P'", otherwise the P value is false. In addition, the monitoring of the x and y voltages is carried out in order to check that said values lie within the valid range.

According to this above-mentioned basic idea the inventors propose both a circuit arrangement and also a method.

The circuit according to the invention of a sensor-triggered control and/or display system in the context of a safety-critical application with a DSP thus comprises:

at least one sensor, which passes position and/or attitude signals in the form of alternating difference voltages, which have an amplitude and a phase, to the DSP (Digital Signal Processor), which calculates relatively accurate and unambiguous position and/or attitude information from the supplied signals, a signal conditioning circuit, which reduces the information content of the position and/or attitude signals, a first sub-component for which a position and attitude calculation that is reduced in terms of accuracy and/or is ambiguous is calculated from the position and/or attitude signals having reduced information content, a second sub-component, which functions as a control instance, which checks whether the unambiguous position and/or attitude determined by the DSP coincides with the inaccurate and/or ambiguous position and/or attitude determined by the position and attitude calculation circuit within the scope of the accuracy and/or ambiguity and/or is contained therein, and a third sub-component, which outputs a sensor fault signal if the check of the control instance is negative.

Advantageously, the signal conditioning circuit can be implemented in such a way that it only passes on the amplitudes of the position and/or attitude signals.

Particularly for implementing a simple circuit that can be fully analyzed and tested according to existing safety rules, it is proposed to produce said signal conditioning circuit from analog components, especially from at least one rectifier diode and at least one downstream low pass filter.

It is also advantageous if at least one of the sub-components is implemented by a combination of an arithmetic unit with software that is executed therein during operation.

According to a specific application of the circuit arrangement according to the invention, it is particularly suitable in safety-relevant applications, for example the at least one sensor can be an attitude sensor of a landing flap of an aircraft.

The inventors further propose a method for monitoring a DSP in the context of a safety-critical application, wherein the DSP determines the actual position and/or attitude of an object from position and/or attitude signals of position and/or attitude sensors as follows:

the information content of the position and/or attitude signals transferred to the DSP is reduced, the reduced information content is passed to a position and attitude calculation instance, which calculates a position and/or attitude having reduced accuracy and/or that is ambiguous from the position and/or attitude signals having reduced information content, a check takes place as to whether the unambiguous position and/or attitude determined by the DSP agrees with the inaccurate and/or ambiguous position and/or attitude determined by the position and attitude calculation circuit to within the scope of the accuracy and/or ambiguity, and a sensor fault signal is output if the check is negative.

Here the signal conditioning circuit can advantageously pass on only the amplitude information of the position and/or attitude signals.

It is also advantageous if the reduction of the information content of the position and/or attitude signals is carried out by analog rectification and then analog low pass filtering. As a rule, circuits of this type can be fully analyzed and tested, thus corresponding to high air transport or military safety requirements.

Furthermore, the calculation of the position and/or attitude from the reduced information content of the position and/or attitude signals can be carried out by an arithmetic unit with the aid of software that is executed during operation.

Similarly, the check as to whether the unambiguous position and/or attitude determined by the DSP coincides with the inaccurate and/or ambiguous position and/or attitude determined by the position and attitude calculation circuit to within the scope of the accuracy and/or ambiguity is carried out by an arithmetic unit with the aid of software that is executed during operation.

Moreover, the output of a sensor fault signal if the check is negative is carried out by an arithmetic unit with the aid of software that is executed during operation.

Finally it is pointed out that in a preferred application of the method according to the invention, the at least one sensor can detect the attitude of a landing flap in each case.

BRIEF DESCRIPTION OF THE DRAWINGS

In the following the invention is described in detail using a preferred specific example embodiment with the aid of the figures, wherein only the features that are necessary for understanding the invention are illustrated.

In the drawings.

DETAILED DESCRIPTION OF EXEMPLARY EMBODIMENTS

Typical position sensors, such as LVDTs, RVDTs, resolvers and synchros are typically stimulated by an alternating voltage and output one or a plurality of secondary alternating voltages corresponding to the detected position, both with different amplitudes and also with different phases of the secondary voltages relative to the stimulation voltage. Said secondary voltages thus contain sensor position information both in their amplitudes and also in their phase angles relative to the stimulation voltage. This is an example of a resolver, i.e. an angle sensor, that is illustrated over a complete rotation in FIGS. 1 through 3.

Figure 1:
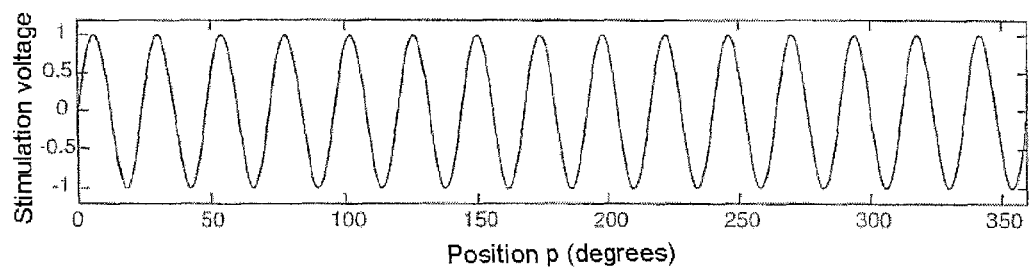
FIG. 1: Profile of the stimulation voltage of a resolver.
Figure 2:
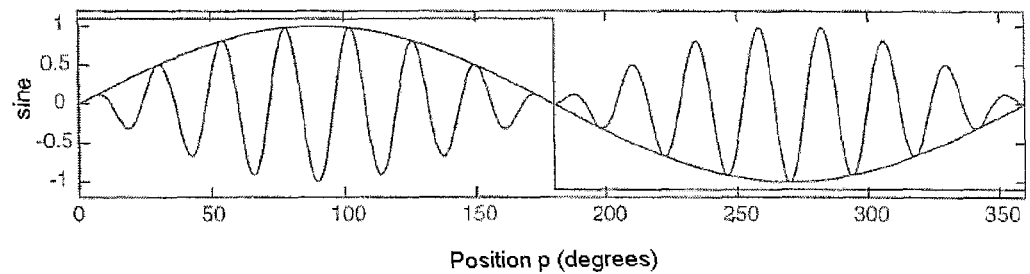
FIG. 2: Profile of the first secondary voltage (sine)
Figure 3:
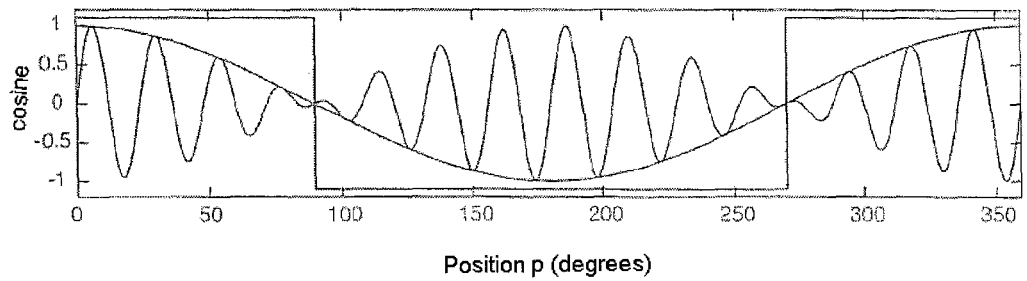
FIG. 3: Profile of the second secondary voltage (cosine)

The diagram of FIG. 1 shows the profile of the stimulation voltage on the ordinate against time, represented by the angular position of the resolver, on the abscissa. FIGS. 2 and 3 show the time-wise parallel profiles of the two secondary voltages in the form of high frequency sine and cosine waves, wherein in addition an envelope illustrates the time variation of the amplitudes. The additional rectangular shaped line describes the phase angle of the secondary voltage, wherein the value 1 stands for in phase and (−1) for out of phase for stimulation.

It is apparent that the phase angle is constant within each quadrant and a secondary voltage phase angle step change occurs at each transition to the next quadrant.

On the other hand, the accurate position within each quadrant can only be detected from the ratio of the amplitudes.

Whereas the amplitude of an alternating voltage can be detected by means of simple rectification, the evaluation of the phase angle is one of the key complexity determining elements of a traditional circuit.

In order to obtain a simple circuit, in the present invention the secondary voltages are rectified and the evaluation of the phase angle is omitted. A control or regulation system generally comprises at least one CPU, which executes the regulation and control algorithm. Said CPU generally comprises at least one analog input (A/D converter), using which the rectified secondary voltages can be detected independently of the DSP.

Figure 4:
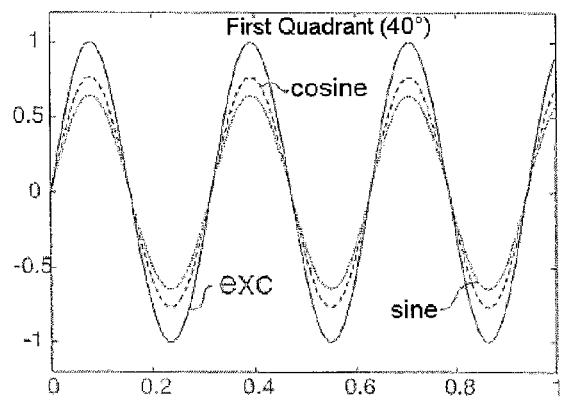
FIG. 4: Phase shift of the secondary voltage of the resolver in the first quadrant for an angular position of 40°.
Figure 5:
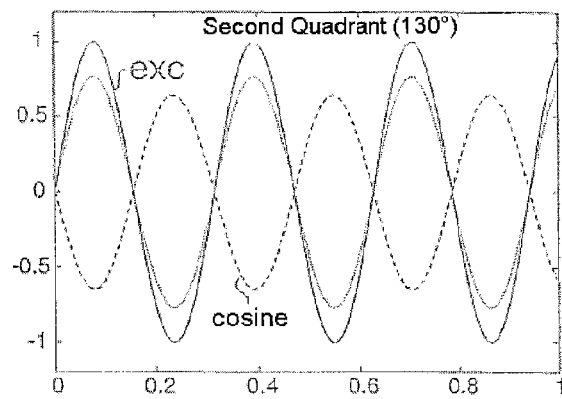
FIG. 5: Phase shift of the secondary voltage of the resolver in the second quadrant for an angular position of 130°.
Figure 6:
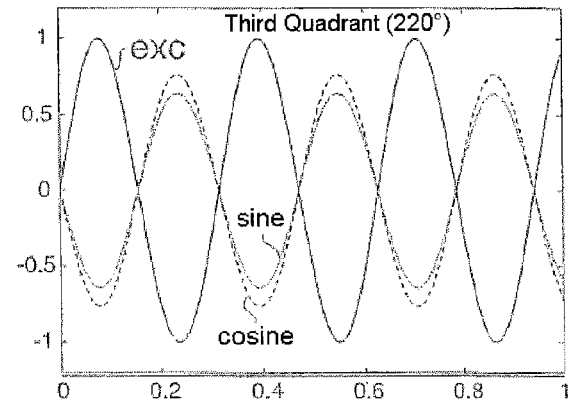
FIG. 6: Phase shift of the secondary voltage of the resolver in the third quadrant for an angular position of 220°.
Figure 7:
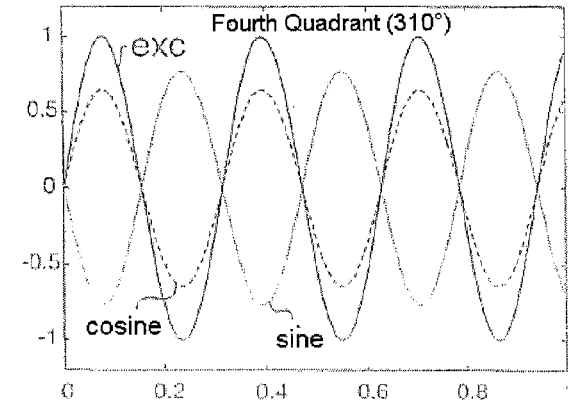
FIG. 7: Phase shift of the secondary voltage of the resolver in the fourth quadrant for an angular position of 310°.

However, with the rectified voltages it is not possible to uniquely determine the sensor position. FIGS. 4 through 7 show the stimulation voltage and the secondary voltage of the above-mentioned resolver, as an example for four different angular positions of the angular transducer, in which the voltages differ only in terms of their phase angle but in which their respective amplitudes are equal. FIG. 4 corresponds to an angular position of 40° in the first quadrant, FIG. 5 corresponds to an angular position of 130° in the second quadrant, FIG. 6 corresponds to an angular position of 220° in the third quadrant and FIG. 7 corresponds to an angular position of 310° in the fourth quadrant.

In order to obtain a smooth amplitude signal, the rectification is coupled to, combined with or integrated together with a low pass filter, wherein in addition amplification can also be provided. The measurement value is subjected to a time delay so that the delay of the rectified secondary voltage should be taken into account either by a later comparison with the DSP output signal or a corresponding time adjustment should be carried out.

In principle, however, it can be checked whether the position or attitude output by the DSP matches one of the four possible position variants calculated from the low pass filtered amplitude signal. If this is not the case then there is an error.

Figure 8:
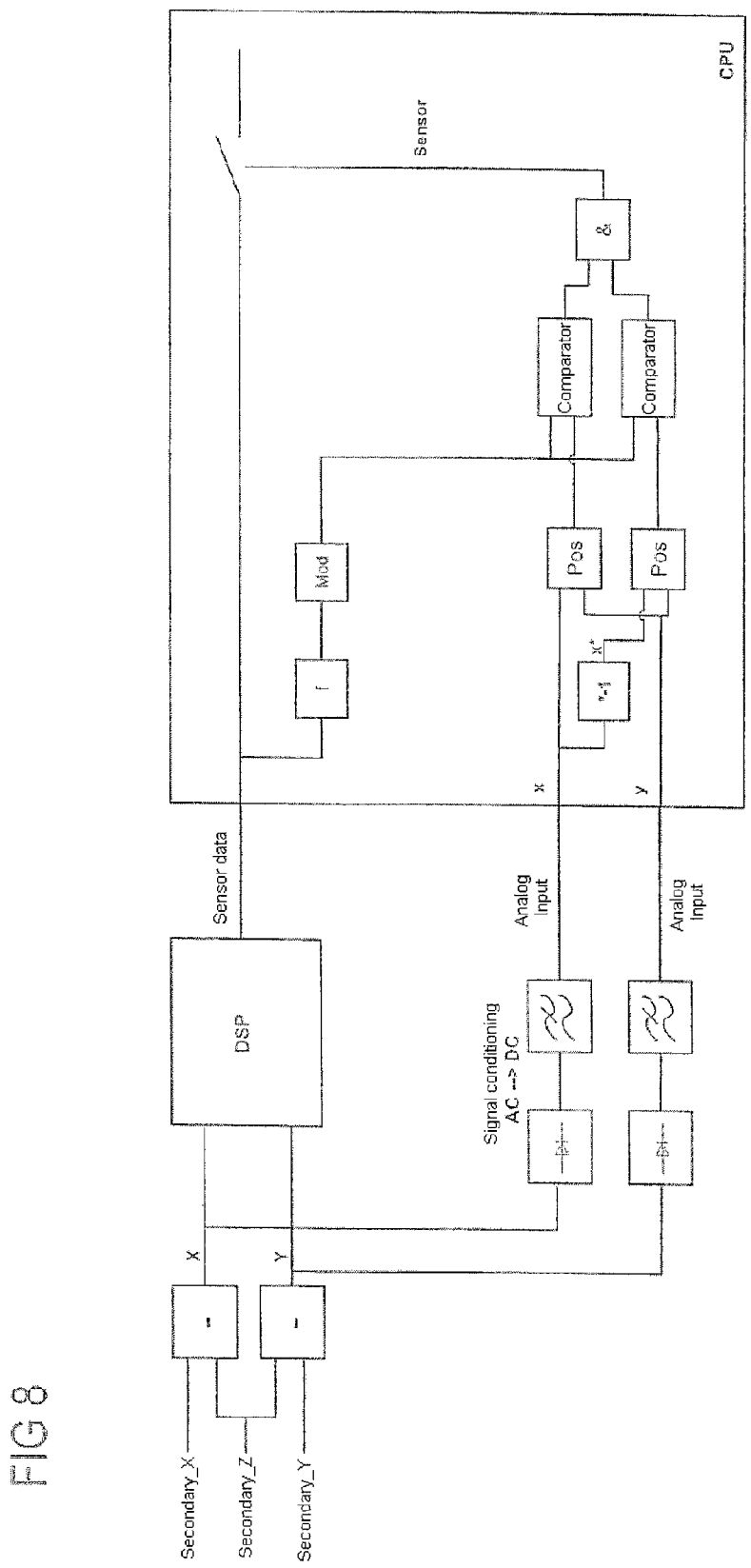
FIG. 8: Circuit arrangement for monitoring according to the invention of sensor values detected by a DSP.

In FIG. 8 only a specific embodiment of a circuit according to the invention for monitoring a DSP is shown. The position and attitude signals of the sensors in the form of the secondary voltages x and y are not only fed to the DSP, but in parallel thereto are fed to a signal conditioning means, where they are each converted by a rectifier and a low pass filter from an alternating voltage into a direct voltage and may be amplified. In the very simple embodiment illustrated here, this single additional hardware circuit that is required can be implemented with two diodes and two resistances.

Digital acquisition of the rectified secondary voltages is then carried out by a CPU independently of the DSP.

Because the phase information is no longer available, the various cases of the phase angle must now be taken into account. The phase information is now replaced by the sign of the rectified secondary voltage. Therefore one or both voltages $x^*=-x$, $y^*=-y$ are inverted.

The determination of two sensor positions that coincide with the detected and with the inverted secondary voltages now takes place, wherein the following applies: $p=f(x,y)$ and $p^*=f(x^*,y)$.

The delay of the low pass filtering and other delays in the measurement chain can be expressed as a transfer function $f(t)$. In order to compensate for this delay, the detected secondary voltages could be subjected to the inverse transfer function. Because this generally leads to undesirable amplification of signal errors, the position value calculated by the DSP is preferably likewise delayed with $f(t)$ instead. The following applies: $P'=f(P(t))$.

In general the delay $g(t)$ in the measurement chain of P is much smaller than the delay in the measurement chain of p, p* and can thus be ignored. Otherwise P' must be determined as follows: $P'=g^{-1}f(P(t))$.

Previously the voltage pairings (x,y*) and (x*,y*) were not taken into account. These can either also be calculated or the position P' is reduced to the range of values covered by p, p*. This takes place in the example by means of the modulo operation $P''=P' \bmod(m)$ with m=180 deg.

At least one of the values p, p* must now be in close agreement with P'' within the scope of the measurement accuracy, otherwise there is an error in the sensor detection.

Additionally, further checks on the detected signals can be carried out in order to improve the error detection. For example, a check of the secondary voltages for a valid range of values or a check of the position P for inconsistencies can be carried out.

Overall, the invention thus provides a circuit arrangement of a sensor-triggered control and/or display system in the context of a safety critical application with a DSP and a method for the monitoring of the DSP, wherein the position and/or attitude signals transferred to the DSP are reduced in terms of their information content, the reduced information content is transferred to a position and attitude calculation instance and is checked as to whether the unambiguous position and/or attitude determined by the DSP agrees with the inaccurate and/or ambiguous position and/or attitude determined by the position and attitude calculation circuit to within the scope of the accuracy and/or ambiguity, and a sensor fault signal is output if the check is negative.

It is understood that the abovementioned features of the invention can not only be used in the respective specified combination, but also in other combinations or on their own, without departing from the scope of the invention.

The invention claimed is:

1. A circuit arrangement of a sensor-triggered control or display system in the context of a safety-critical application with a digital signal processor (DSP), comprising:
   at least one sensor, wherein the at least one sensor passes position or attitude signals in the form of alternating difference voltages to the DSP, wherein each alternating difference voltage has an amplitude and a phase, wherein the DSP calculates a first position or attitude from the position or attitude signals, wherein the first position or attitude meets a predetermined requirement to be accurate and unambiguous,
   a signal conditioning circuit, which reduces information content of the position or attitude signals to generate reduced position or attitude signals,
   a first sub-component comprising a position and attitude calculation circuit, wherein the position and attitude calculation circuit determiners a second position or attitude based on the reduced position or attitude signals, wherein the second position or attitude does not meet the predetermined requirement,
   a second sub-component comprising a control unit, wherein the control unit compares the first position or attitude with the respective second position or attitude to generate a difference and determines whether the difference is within a predetermined scope of accuracy, and
   a third sub-component, which outputs a sensor fault signal when the determination of the control unit is negative.

2. The circuit arrangement as claimed in claim 1, wherein the signal conditioning circuit is configured such that only amplitudes of the position or attitude signals are allowed to pass.

3. The circuit arrangement as claimed in claim 2, wherein the signal conditioning circuit comprises analog components.

4. The circuit arrangement as claimed in claim 1, wherein the signal conditioning circuit comprises at least one rectifier diode and at least one downstream low pass filter.

5. The circuit arrangement as claimed in claim 1, wherein at least one of the sub-components comprises an arithmetic unit having software that is executed therein during operation.

6. The circuit arrangement as claimed in claim 1, wherein the at least one sensor comprises an attitude sensor of a landing flap.

7. A method for the monitoring a digital signal processor (DSP) in the context of a safety-critical application, wherein the DSP determines a first position or attitude of an object from position or attitude signals of position or attitude sensors, wherein the first position or attitude meets a predetermined requirement to be accurate and unambiguous, the method comprising:
   reducing information content of the position or attitude signals transferred to the DSP to generate reduced position or attitude signals,
   supplying the reduced position or attitude signals to a position and attitude calculation unit, wherein the position and attitude calculation circuit determiners a second position or attitude based on the reduced position or attitude signals, wherein the second position or attitude does not meet the predetermined requirement,
   comparing the first position or attitude with the respective second position or attitude to generate a difference and determines whether the difference is within a predetermined scope of accuracy, and
   outputting a sensor fault signal when the determination of the control unit is negative.

8. The method as claimed in claim 7, wherein the signal conditioning circuit only passes amplitudes of the position or attitude signals.

9. The method as claimed in claim 7, wherein the reducing the information content of the position or attitude signals comprises processing the position or attitude signals through analog rectification and subsequent analog low pass filtering.

10. The method as claimed in claim 7, wherein the determination of the second position or attitude based on the reduced position or attitude signals is implemented by an arithmetic unit having software that is executed during operation.

11. The method as claimed in claim 7, wherein the comparing the first position or attitude with the respective second position or attitude to generate a difference and the determination of whether the difference is within the predetermined scope of accuracy is implemented by an arithmetic unit having software that is executed during operation.

12. The method as claimed in claim 7, wherein the outputting the sensor fault signal when the determination of the control unit is negative is implemented by an arithmetic unit having software that is executed during operation.

13. The method as claimed in claim 7, wherein each of the at least one sensors detects the attitude of a landing flap.

* * * * *